(12) United States Patent
Lee et al.

(10) Patent No.: US 7,310,479 B2
(45) Date of Patent: Dec. 18, 2007

(54) MULTI-WAVELENGTH OPTICAL PACKET SWITCH SYSTEM WITH SHARED OUTPUT BUFFER

(75) Inventors: Shi-Wei Lee, Bade (TW); Yi-Ching Liaw, Chu Yaun Tsun (TW); Chum-Shiow Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 625 days.

(21) Appl. No.: 10/750,773

(22) Filed: Jan. 5, 2004

(65) Prior Publication Data

US 2005/0063703 A1    Mar. 24, 2005

(30) Foreign Application Priority Data

Sep. 18, 2003    (TW) .............................. 92125822 A (51) Int. Cl.
*H04J 14/00*    (2006.01)
(52) U.S. Cl. .............................. 398/45; 398/46; 398/49
(58) Field of Classification Search ............. 398/45–54
See application file for complete search history.

(56) References Cited

U.S. PATENT DOCUMENTS

| | | | |
|---|---|---|---|
| 5,416,769 A | 5/1995 | Karol | |
| 5,469,284 A | 11/1995 | Haas | |
| 5,828,472 A | 10/1998 | Masetti | |
| 6,519,062 B1 | 2/2003 | Yoo | |
| 7,120,157 B2 * | 10/2006 | Xue et al. .................... | 370/401 |
| 2003/0133641 A1* | 7/2003 | Yoo ........................... | 385/14 |
| 2004/0223762 A1* | 11/2004 | Lee et al. ..................... | 398/51 |
| 2005/0053375 A1* | 3/2005 | Yoo et al. ..................... | 398/53 |

OTHER PUBLICATIONS

David K. Hunter et. al., *WASPNET: A Wavelength Switched Packet Network*, Mar. 1999, IEEE Communications Magazine, pp. 120-129.

* cited by examiner

*Primary Examiner*—Dzung Tran
(74) *Attorney, Agent, or Firm*—Bacon & Thomas, PLLC (57) ABSTRACT

A multi-wavelength optical packet switch system with shared output buffer is disclosed, which includes N input fibers, N output fibers, an input device, a wavelength converter, a wavelength router, an output buffer, a wavelength classifier and a control device. The present invention utilizes both the tunable wavelength converter and the wavelength router to accomplish multi-wavelength optical packet switching. The present invention also provides the output buffer connected to the output of the wavelength router for being shared by optical packets in all wavelengths (channels), thereby avoiding the packet loss due to output conflicts and reducing the cost of establishing the buffer.

19 Claims, 5 Drawing Sheets

| | I0 | I1 | I2 | I3 | I4 | I5 | I6 | I7 | I8 | I9 | I10 | I11 | I12 | I13 | I14 | I15 |
|---|---|---|---|---|---|---|---|---|---|---|---|---|---|---|---|---|
| O0 | $\lambda_0$ | $\lambda_{15}$ | $\lambda_{14}$ | $\lambda_{13}$ | $\lambda_{12}$ | $\lambda_{11}$ | $\lambda_{10}$ | $\lambda_9$ | $\lambda_8$ | $\lambda_7$ | $\lambda_6$ | $\lambda_5$ | $\lambda_4$ | $\lambda_3$ | $\lambda_2$ | $\lambda_1$ |
| O1 | $\lambda_1$ | $\lambda_0$ | $\lambda_{15}$ | $\lambda_{14}$ | $\lambda_{13}$ | $\lambda_{12}$ | $\lambda_{11}$ | $\lambda_{10}$ | $\lambda_9$ | $\lambda_8$ | $\lambda_7$ | $\lambda_6$ | $\lambda_5$ | $\lambda_4$ | $\lambda_3$ | $\lambda_2$ |
| O2 | $\lambda_2$ | $\lambda_1$ | $\lambda_0$ | $\lambda_{15}$ | $\lambda_{14}$ | $\lambda_{13}$ | $\lambda_{12}$ | $\lambda_{11}$ | $\lambda_{10}$ | $\lambda_9$ | $\lambda_8$ | $\lambda_7$ | $\lambda_6$ | $\lambda_5$ | $\lambda_4$ | $\lambda_3$ |
| O3 | $\lambda_3$ | $\lambda_2$ | $\lambda_1$ | $\lambda_0$ | $\lambda_{15}$ | $\lambda_{14}$ | $\lambda_{13}$ | $\lambda_{12}$ | $\lambda_{11}$ | $\lambda_{10}$ | $\lambda_9$ | $\lambda_8$ | $\lambda_7$ | $\lambda_6$ | $\lambda_5$ | $\lambda_4$ |
| O4 | $\lambda_4$ | $\lambda_3$ | $\lambda_2$ | $\lambda_1$ | $\lambda_0$ | $\lambda_{15}$ | $\lambda_{14}$ | $\lambda_{13}$ | $\lambda_{12}$ | $\lambda_{11}$ | $\lambda_{10}$ | $\lambda_9$ | $\lambda_8$ | $\lambda_7$ | $\lambda_6$ | $\lambda_5$ |
| O5 | $(\lambda_5)$ | $\lambda_4$ | $\lambda_3$ | $\lambda_2$ | $\lambda_1$ | $\lambda_0$ | $\lambda_{15}$ | $(\lambda_{14})$ | $\lambda_{13}$ | $\lambda_{12}$ | $\lambda_{11}$ | $\lambda_{10}$ | $\lambda_9$ | $\lambda_8$ | $\lambda_7$ | $\lambda_6$ |
| O6 | $\lambda_6$ | $\lambda_5$ | $\lambda_4$ | $\lambda_3$ | $\lambda_2$ | $\lambda_1$ | $\lambda_0$ | $\lambda_{15}$ | $\lambda_{14}$ | $\lambda_{13}$ | $\lambda_{12}$ | $\lambda_{11}$ | $\lambda_{10}$ | $\lambda_9$ | $\lambda_8$ | $\lambda_7$ |
| O7 | $\lambda_7$ | $\lambda_6$ | $\lambda_5$ | $\lambda_4$ | $\lambda_3$ | $\lambda_2$ | $\lambda_1$ | $\lambda_0$ | $\lambda_{15}$ | $\lambda_{14}$ | $\lambda_{13}$ | $\lambda_{12}$ | $\lambda_{11}$ | $\lambda_{10}$ | $\lambda_9$ | $\lambda_8$ |
| O8 | $\lambda_8$ | $\lambda_7$ | $\lambda_6$ | $\lambda_5$ | $\lambda_4$ | $\lambda_3$ | $\lambda_2$ | $\lambda_1$ | $\lambda_0$ | $\lambda_{15}$ | $\lambda_{14}$ | $\lambda_{13}$ | $\lambda_{12}$ | $\lambda_{11}$ | $\lambda_{10}$ | $\lambda_9$ |
| O9 | $\lambda_9$ | $\lambda_8$ | $\lambda_7$ | $\lambda_6$ | $\lambda_5$ | $\lambda_4$ | $\lambda_3$ | $\lambda_2$ | $\lambda_1$ | $\lambda_0$ | $\lambda_{15}$ | $\lambda_{14}$ | $\lambda_{13}$ | $\lambda_{12}$ | $\lambda_{11}$ | $\lambda_{10}$ |
| O10 | $\lambda_{10}$ | $\lambda_9$ | $\lambda_8$ | $\lambda_7$ | $\lambda_6$ | $\lambda_5$ | $\lambda_4$ | $\lambda_3$ | $\lambda_2$ | $\lambda_1$ | $\lambda_0$ | $\lambda_{15}$ | $\lambda_{14}$ | $\lambda_{13}$ | $\lambda_{12}$ | $\lambda_{11}$ |
| O11 | $\lambda_{11}$ | $\lambda_{10}$ | $\lambda_9$ | $\lambda_8$ | $\lambda_7$ | $\lambda_6$ | $\lambda_5$ | $\lambda_4$ | $\lambda_3$ | $\lambda_2$ | $\lambda_1$ | $\lambda_0$ | $\lambda_{15}$ | $\lambda_{14}$ | $\lambda_{13}$ | $\lambda_{12}$ |
| O12 | $\lambda_{12}$ | $\lambda_{11}$ | $\lambda_{10}$ | $\lambda_9$ | $\lambda_8$ | $\lambda_7$ | $\lambda_6$ | $\lambda_5$ | $\lambda_4$ | $\lambda_3$ | $\lambda_2$ | $\lambda_1$ | $\lambda_0$ | $\lambda_{15}$ | $\lambda_{14}$ | $\lambda_{13}$ |
| O13 | $\lambda_{13}$ | $\lambda_{12}$ | $\lambda_{11}$ | $\lambda_{10}$ | $\lambda_9$ | $\lambda_8$ | $\lambda_7$ | $\lambda_6$ | $\lambda_5$ | $\lambda_4$ | $\lambda_3$ | $\lambda_2$ | $\lambda_1$ | $\lambda_0$ | $\lambda_{15}$ | $\lambda_{14}$ |
| O14 | $\lambda_{14}$ | $\lambda_{13}$ | $\lambda_{12}$ | $\lambda_{11}$ | $\lambda_{10}$ | $\lambda_9$ | $\lambda_8$ | $\lambda_7$ | $\lambda_6$ | $\lambda_5$ | $\lambda_4$ | $\lambda_3$ | $\lambda_2$ | $\lambda_1$ | $\lambda_0$ | $\lambda_{15}$ |
| O15 | $\lambda_{15}$ | $\lambda_{14}$ | $\lambda_{13}$ | $\lambda_{12}$ | $\lambda_{11}$ | $\lambda_{10}$ | $\lambda_9$ | $\lambda_8$ | $\lambda_7$ | $\lambda_6$ | $\lambda_5$ | $\lambda_4$ | $\lambda_3$ | $\lambda_2$ | $\lambda_1$ | $\lambda_0$ |

MULTI-WAVELENGTH OPTICAL PACKET SWITCH SYSTEM WITH SHARED OUTPUT BUFFER

BACKGROUND OF THE INVENTION

1. Field of the Invention

The present invention relates to the technical field of multi-wavelength optical packet switching and, more particularly, to a multi-wavelength optical packet switch system with shared output buffer.

2. Description of Related Art

Currently, signals of multiple channels (wavelengths) in an optical fiber can be transmitted concurrently with the use of wavelength division multiplexing (WDM) technology. Thus, the available bandwidth for a single optical fiber is significantly increased.

Since both data transmission rate and wavelength number transmittable by a single optical fiber are increasingly improved, typical optoelectric transformations for packet switching in optical communication networks are increasingly unsatisfied. To overcome this, U.S. Pat. No. 5,416,769 granted to Karol for a "Controlled-feedback packet switching system" applies a shared buffer to delay the transmission of input packets in accordance with the output conflicts, thereby increasing packet switching efficiency. However, such a configuration can be applied in a one-wavelength packet switching only. For a multi-wavelength optical communication network, the buffer cannot be shared by other wavelengths (channels).

Accordingly, U.S. Pat. No. 5,469,284 granted to Hass for an "Optical packet switch" further applies an input buffer to overcome the aforementioned problem of packet switching efficiency. In such a configuration, delay time for an input packet is determined on a scheduling stage and subsequently the input packet is switched to an appropriate output in a switch stage. However, the input buffer effects the limited improvement and can be applied in a one-wavelength packet switching only. For a multi-wavelength optical communication network, the input buffer cannot be shared by other wavelengths (channels). Besides, it needs a lot of 2×2 optical switches to thus increase much cost.

Accordingly, U.S. Pat. No. 6,519,062 granted to Yoo for an "Ultra-low latency multi-protocol optical routers for the next generation internet" further applies a plurality of shared buffers. In such a configuration, separated wavelengths at each input terminal are fed to a switch at the same time. The switch can be divided into several levels on practical needs, such that the plurality of shared buffers can be used to delay the transmission of packets when the output conflicts are encountered, thereby providing the cited packet switching for a multi-wavelength optical communication network. However, additional I/O ports for two tunable wavelength converters (WCs) and one wavelength router (WR) are required for each additional shared buffer, which significantly increases the cost. Therefore, it is desirable to provide an improved multi-wavelength optical packet switch system to mitigate and/or obviate the aforementioned problems.

SUMMARY OF THE INVENTION

The object of the present invention is to provide a multi-wavelength optical packet switch system with shared output buffer, which can overcome the problems that the prior techniques cannot process multi-wavelength optical packet switching, the packets may be lost during output conflicts, and the cost of establishing buffers is high.

In accordance with a feature of the present invention, a multi-wavelength optical packet switch system with shared output buffer is provided. The system includes N input fibers, N output fibers, an input device, a wavelength converter, a wavelength router, an output buffer, a wavelength classifier and a control device. Each of the N input fibers can transmit an M-wavelength optical signal which has M wavelengths, so can each of the output fibers, where M, N are positive integers. The input device is connected to the N input fibers in order to separate the M-wavelength optical signal in each input fiber into M input optical signals corresponding to the M wavelengths. The wavelength converter is connected to the input device in order to tune wavelengths of the input optical signals. The wavelength router is connected to the wavelength converter in order to switch packets of each optical signal outputted by the wavelength converter. The output buffer is connected to the wavelength router in order to provide output optical packets of the wavelength router with time delay from 0 to L packet frames. The wavelength classifier is connected to the output buffer in order to tune wavelengths for the output optical packets to wavelengths of the corresponding output fibers. The control device is connected to the wavelength converter in order to read packet headers of the input optical signals to accordingly analyze output fiber fields of all packet headers, thus obtaining output fibers and corresponding output conflicts for adjusting the wavelength converter and subsequently completing packet switching performed by the wavelength router.

In accordance with another feature of the present invention, a multi-wavelength optical packet switch system with shared output buffer is provided. The system includes N input fibers, N output fibers, an input device, a first wavelength converter, a first wavelength router, a second wavelength converter, a second wavelength router, an output buffer, a wavelength classifier and a control device. Each of the N input fibers can transmit an M-wavelength optical signal which has M wavelengths, so can each of the output fibers, where M, N are positive integers. The input device is connected to the N input fibers in order to separate the M-wavelength optical signal in each input fiber into M input optical signals corresponding to the M wavelengths. The first wavelength converter is connected to the input device in order to tune wavelengths of the input optical signals. The first wavelength router is connected to the first wavelength converter in order to switch packets of the input optical signals for averagely dispatching the packets to available wavelengths. The second wavelength converter is connected to the first wavelength router in order to tune wavelength of each optical signal outputted by the first wavelength router. The second wavelength router is connected to the second wavelength converter in order to switch packets of each optical signal outputted by the second wavelength converter. The output buffer is connected to the second wavelength router in order to provide output optical packets of the wavelength router with time delay from 0 to L packet frames. The wavelength classifier is connected to the output buffer in order to tune wavelengths for the output optical packets to wavelengths of the corresponding output fibers. The control device is connected to the first and second wavelength converters in order to read packet headers of the input optical signals to accordingly analyze output fiber fields of all packet headers, thus obtaining output fibers and corresponding output conflicts for adjusting the first wavelength converter, setting the second wavelength converter, and subsequently completing packet switching of the optical signals by the wavelength router.

BRIEF DESCRIPTION OF THE DRAWINGS

FIG. 3 is a wavelength switching table of a 16×16 wavelength router in accordance with the invention;

DETAILED DESCRIPTION OF THE PREFERRED EMBODIMENT

Figure 1:
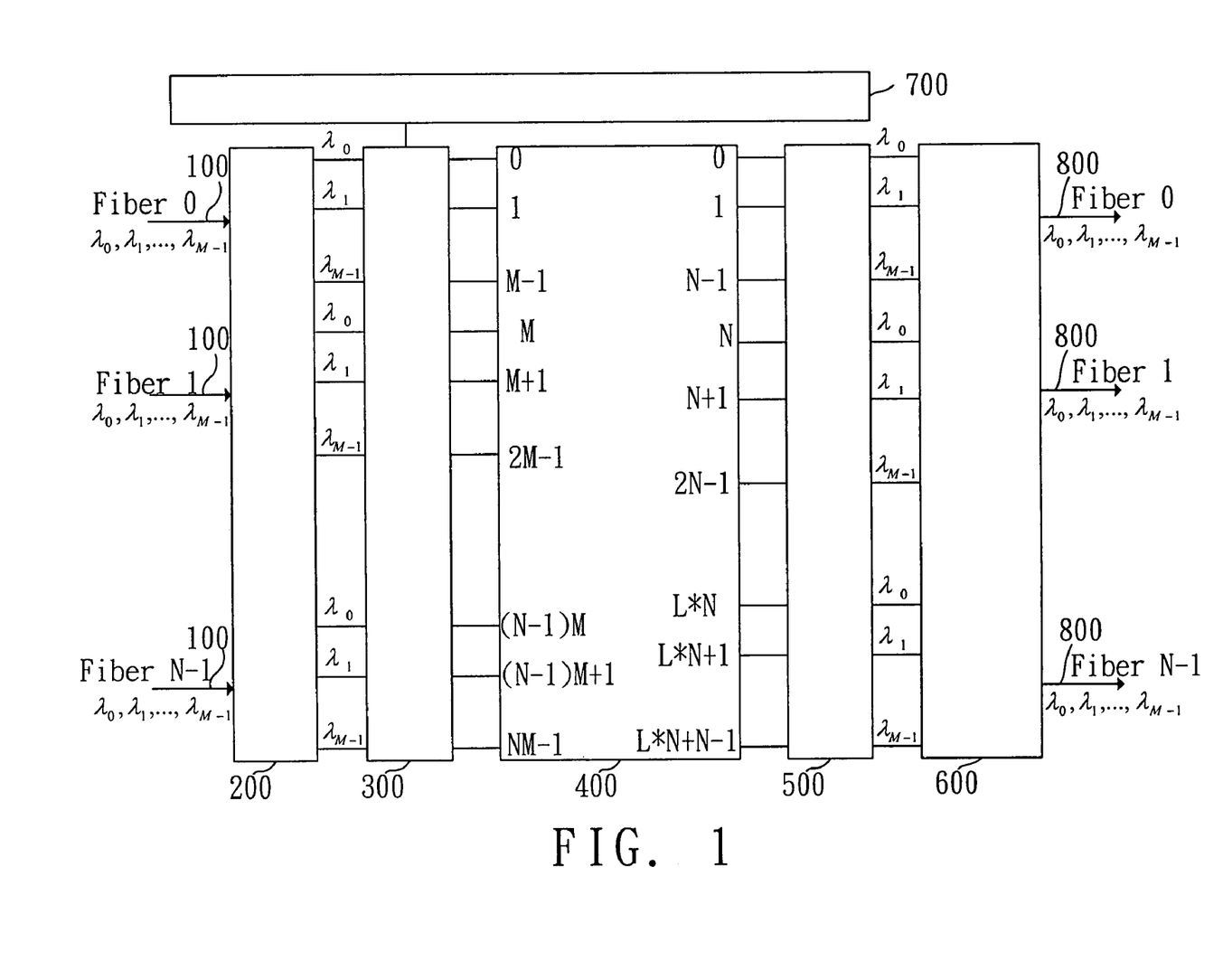
FIG. 1 is a block diagram of a multi-wavelength optical packet switch system with shared output buffer in accordance with the invention.

FIG. 1 shows a block diagram of a multi-wavelength optical packet switch system with shared output buffer in accordance with the invention. In FIG. 1, the system includes N input fibers 100, N output fibers 800, an input device 200, a wavelength converter 300, a wavelength router 400, an output buffer 500, a wavelength classifier 600 and a control device 700. As shown, each of the N input fibers (numbered from 0 to N−1) 100 can transmit an M-wavelength optical signal which has M wavelengths $\lambda_0, \lambda_1, \ldots, \lambda_{M-1}$, so can each of the N output fibers (numbered from 0 to N−1) 800, where N, M are positive integers.

The input device 200 is connected to the N input fibers 100 in order to separate the M-wavelength optical signal in each fiber into M input optical signals respective to the M wavelengths $\lambda_0, \lambda_1, \ldots, \lambda_{M-1}$. The wavelength converter 300 is connected to the input device 200 in order to tune wavelengths of the input optical signals. The wavelength router 400 is connected to the wavelength converter 300 in order to switch packets of each optical signal outputted by the wavelength converter 300. The output buffer 500 is connected to the wavelength router 400 in order to provide output optical packets of the wavelength router with time delay from 0 to L packet frames.

The wavelength classifier 600 is connected to the output buffer 500 in order to tune wavelengths for the output optical packets to wavelengths of the corresponding output fibers. The control device 700 is connected to the wavelength converter 300 in order to read packet headers of the input optical signals to accordingly analyze output fiber fields of all packet headers, thus obtaining output fibers and corresponding output conflicts for adjusting the wavelength converter 300 and subsequently completing packet switching performed by the wavelength router 400.

Figure 2:
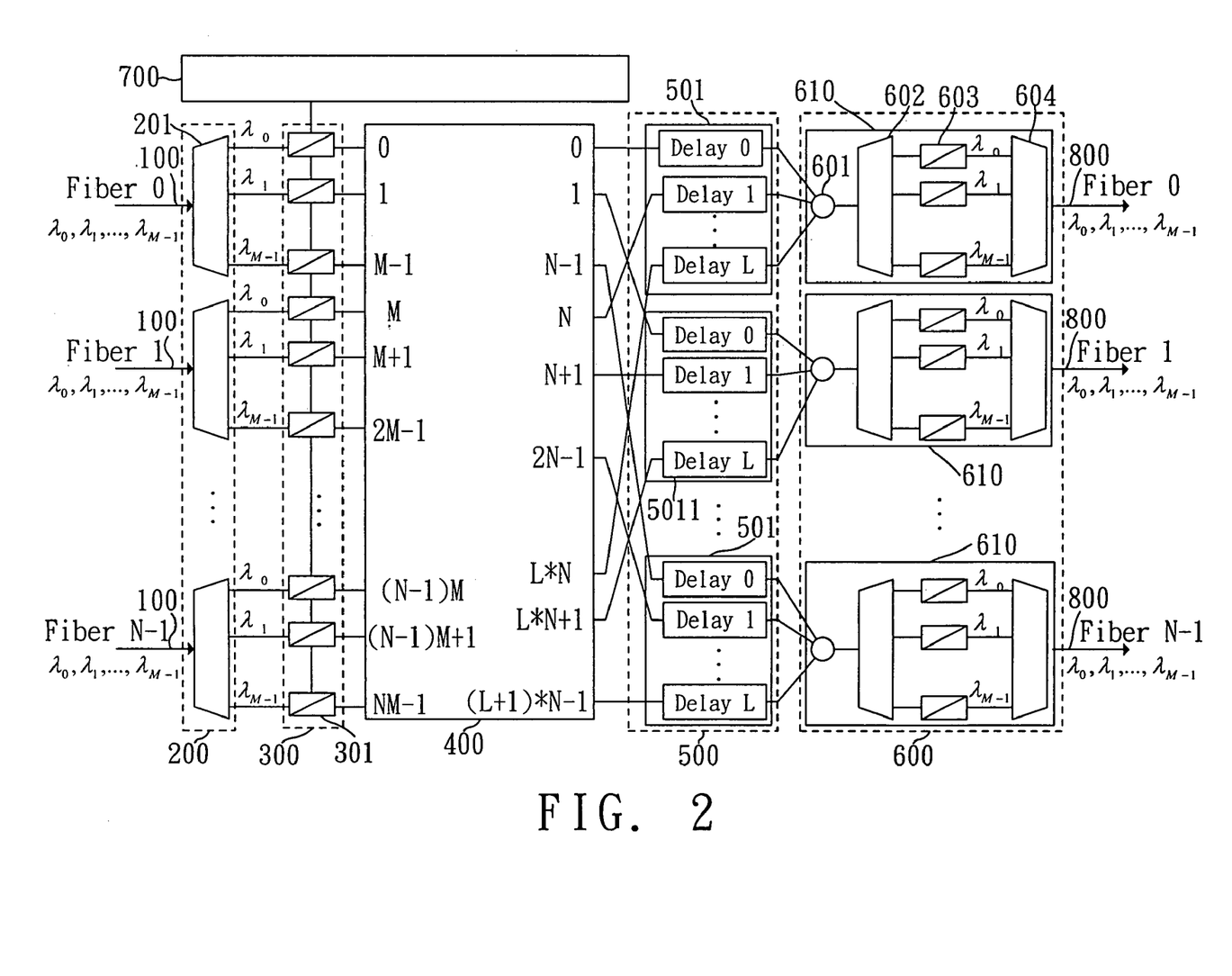
FIG. 2 is a block diagram of the detail of FIG. 1 in accordance with the invention.

FIG. 2 is a block diagram of the detail of FIG. 1 in accordance with the invention. As shown, the input device 200 has N optical demultiplexers 201, each having an input terminal and M output terminals. The input terminal of each optical demultiplexer 201 is connected to one of the N input fibers 100 in order to separate the M-wavelength optical signal into M input optical signals respective to M wavelengths $\lambda_0, \lambda_1, \ldots, \lambda_{M-1}$ of the input fiber. Further, for the M input optical signals, the optical signal with $\lambda_0$ is outputted by a first output terminal, the optical signal with $\lambda_1$ is outputted by a second output terminal, and so on.

The wavelength converter 300 consists of N×M tunable wavelength converters (TWCs) 301, wherein ((I−1)*M)-th to (I*M−1)-th tunable wavelength converters 301 are coupled respectively to M output terminals of I-th optical demultiplexer. For example, M-th tunable wavelength converter 301 is connected to a first output terminal of a second optical demultiplexer 201, (M+1)-th tunable wavelength converter 301 is connected to a second output terminal of the second optical demultiplexer 201, and (2M−1)-th tunable wavelength converter 301 is connected to an M output terminal of the second optical demultiplexer 201.

The wavelength router 400 can be an arrayed waveguide grating (AWG), which has N×M input terminals and (L+1)×N output terminals. Thus, it can switch packets of optical signals of the wavelength converter 300. FIG. 3 is a wavelength-switching table of a 16×16 wavelength router in accordance with the invention. As shown in FIG. 3, an input packet's wavelength is determined by a relative position of input and output terminals applied by the wavelength router 400. For example, for switching an input packet from an input terminal I0 to an output terminal O5, the required wavelength for the input packet is $\lambda_5$, and for switching an input packet from an input terminal I7 to the output terminal O5, the required wavelength for the input packet is $\lambda_{14}$.

For switching an input packet to an assigned output terminal of the wavelength router 400, a TWC is applied to change a corresponding wavelength for the input packet into an assigned wavelength of the assigned output terminal to output. The control device 700 sets converted wavelengths of the TWCs 301 in accordance with the following equation:

$$W_{ijkl} = (NM - iM - j + k(L+1) + l) \bmod (NM), \quad (1)$$

where N is fiber number, M is transmittable wavelength number in one fiber, L is the maximum number of packet frames for time delay, i is serial number of input fiber for input packets, j is serial number of input wavelength for input packets, k is the number of packet frames required by input packets for time delay, l is serial number of output fiber for output packets, and $W_{ijkl}$ is serial number of converted wavelength of the (i, j)-th TWC. In accordance with equation (1), a wavelength for an input packet can be converted into an assigned wavelength and subsequently the input packet in the assigned wavelength is outputted by a corresponding output terminal of the wavelength router 400.

The output buffer 500 consists of N delay devices 501 numbered from 0 to (N−1), each having (L+1) optical delay elements 5011 numbered from 0 to L. The (L+1)×N optical delay elements 5011 can be optical fiber delay lines. Further, number p optical delay element 5011 provides delay time with p packet frames. For example, number 1 optical delay element 5011 provides delay time with one packet frame, and number 0 optical delay element 5011 has no delay time.

Input terminals of the (L+1)×N optical delay elements 5011 of the output buffer 500 are connected respectively to (L+1)×N output terminals of the wavelength router 400 in accordance with equation (2):

$$OB_{ab} = a + bN, \quad (2)$$

where N is total output fiber number, a is serial number of output fiber, b is serial number of optical delay element 5011, and $OB_{ab}$ is serial number of output port of the wavelength router 400. For example, an optical delay element 5011 (numbered L) of a delay device 501 (numbered 1) corresponding to number 1 output fiber is connected to number (L×N+1) output port of the wavelength router 400, and an optical delay element 5011 (numbered L) of a delay device 501 (numbered N−1) corresponding to number (N−1) output fiber is connected to number ((L+1)×N−1) output port of the wavelength router 400.

The wavelength classifier 600 consists of N wavelength classifying elements 610 respectively coupled between the N delay devices of the output buffer 500 and the N output fibers. Each of the wavelength classifying elements further consists of an optical coupler 601, a modulus optical demultiplexer 602, M fixed wavelength converters 603 and an optical multiplexer 604.

Figure 4:
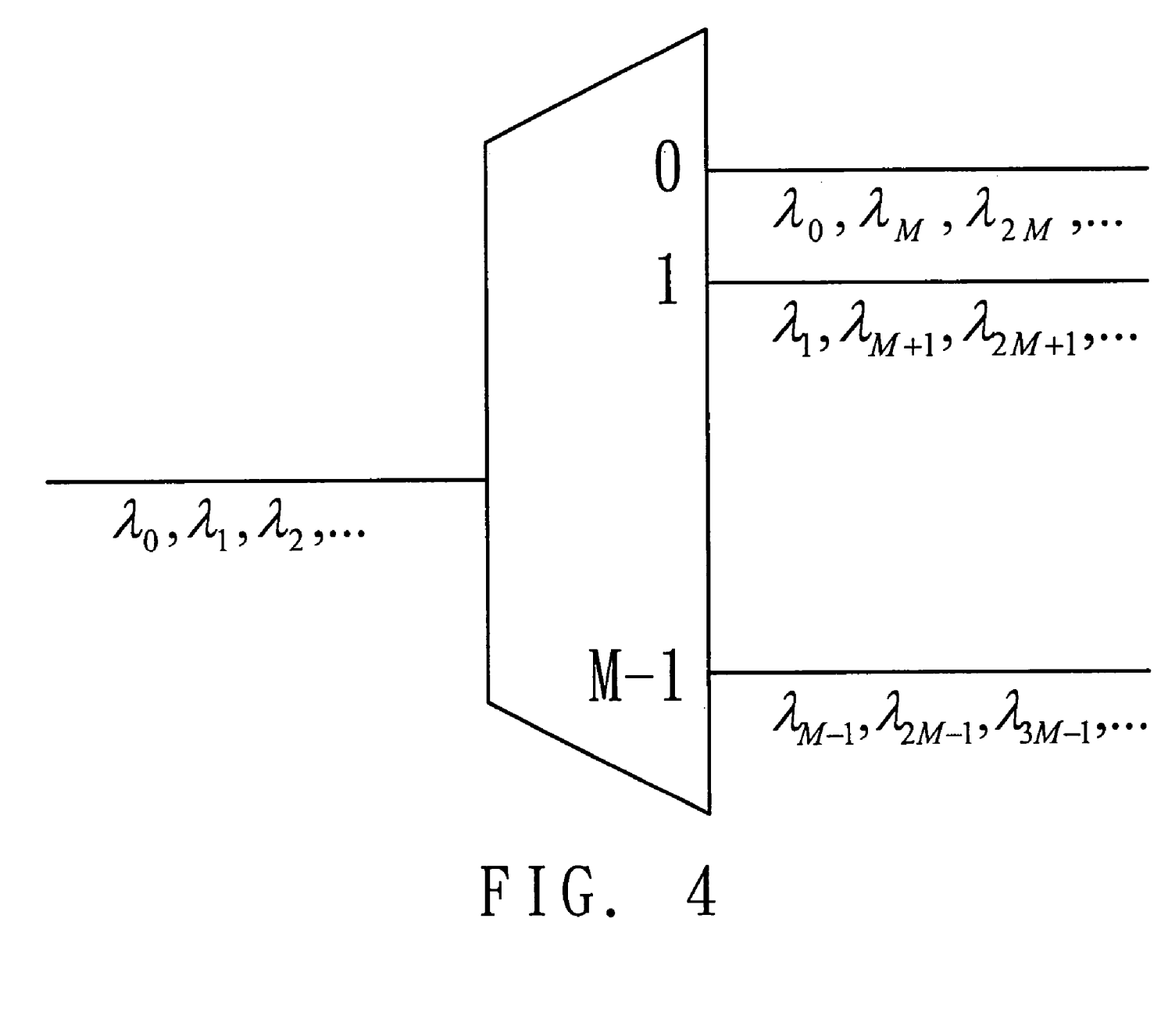
FIG. 4 is a schematic diagram of a modulus optical demultiplexer in accordance with the invention.

The optical coupler 601 has (L+1) input terminals corresponding to the (L+1) optical delay elements for optical coupling, and an output terminal for output. The demultiplexer 602 has an input terminal and M output terminals, wherein the input terminal is connected to the output terminal of the optical coupler 601 for separating optical signals with different wavelengths generated by the optical coupler 601 for being outputted by each of the M output terminals. FIG. 4 is a schematic diagram of the modulus optical demultiplexer 602 with a module M. As shown in FIG. 4, the demultiplexer 602 outputs optical signals ($\lambda_0$, $\lambda_M$, $\lambda_{2M}$, ...) respectively with wavelengths numbered (0, M, 2M ...) by its 0-th output terminal and optical signals ($\lambda_1$, $\lambda_{M+1}$, $\lambda_{2M+1}$, ...) respectively with wavelengths numbered (1, (M+1), (2M+1) ...) by its first output terminal. The modulus optical demultiplexer 602 can be a 1×N AWG.

The fixed wavelength converters 603 respectively have an input terminal and an output terminal, wherein the input terminal is connected to one of the M output terminals of the demultiplexer 602 for converting packets of output optical signals of the demultiplexer 602 into an assigned wavelength for output by the output terminal.

The optical multiplexer 604 has M input terminals and an output terminal, wherein the M input terminals are connected respectively to the output of each of the converters 603 for merging output optical signals with wavelengths and accordingly the output terminal outputs a resulting signal with the wavelengths to one of the N output fibers 800.

Figure 5:
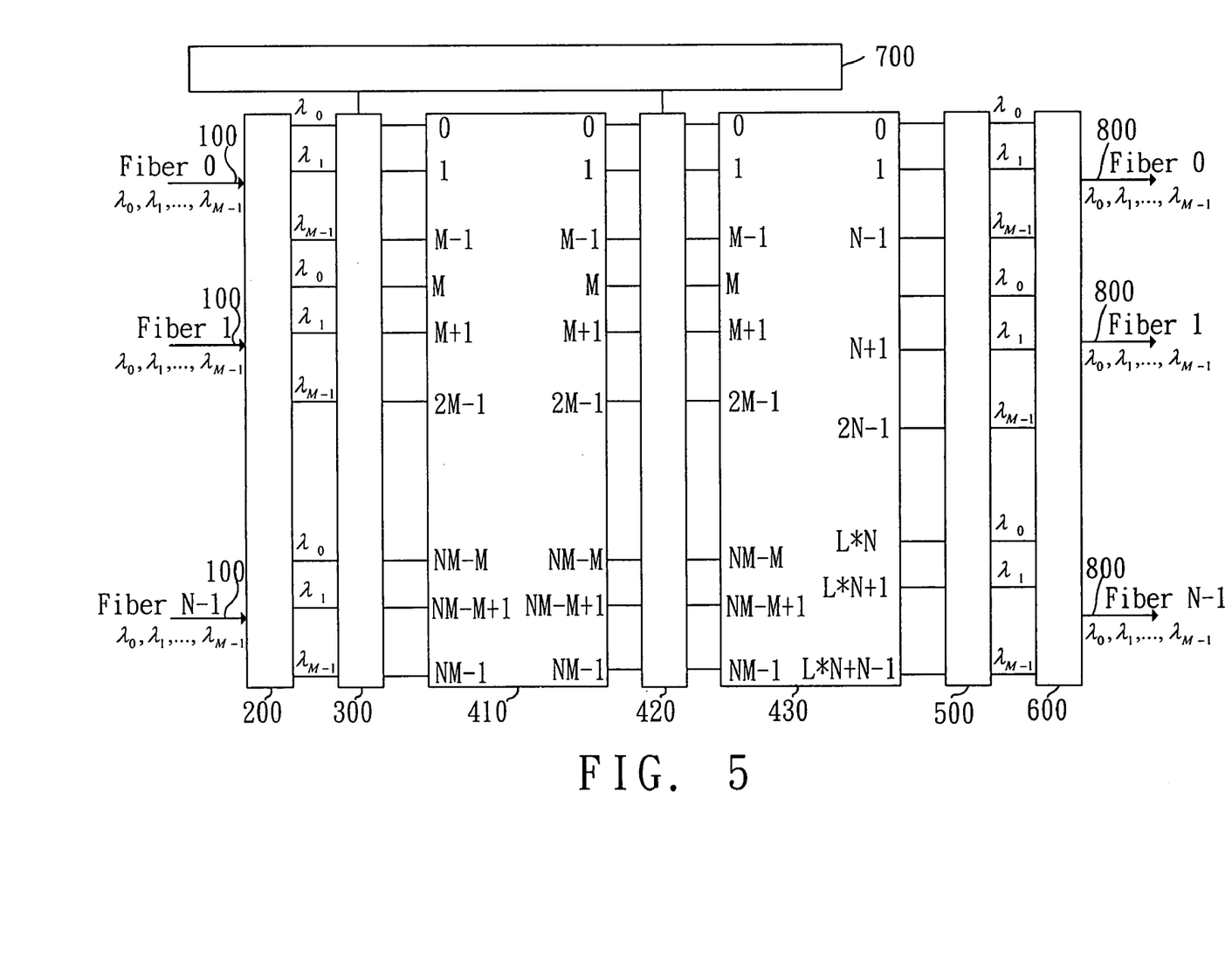
FIG. 5 is a block diagram of another embodiment in accordance with the invention.

FIG. 5 is a block diagram of another embodiment in accordance with the invention. In this embodiment, the system includes N input fibers 100, N output fibers 800, an input device 200, a first wavelength converter 300, a first wavelength router 410, a second wavelength converter 420, a second wavelength router 430, an output buffer 500, a wavelength classifier 600 and a control device 700.

The embodiment shown in FIG. 5 is similar to the previous one shown in FIG. 1, except that the wavelength router 400 of FIG. 1 is replaced with the first wavelength router 410, the second converter 420 and the second wavelength router 430. The control device 700 sets converted wavelengths of tunable wavelength converters of the first wavelength converter 300 based on the following equation:

$$W_{ijkl}^1 = i \times M + j, \quad (3)$$

where M is transmittable wavelength number in a fiber, i is serial number of input fiber for input packets, j is serial number of output wavelength for packet and $W_{ij}^1$ is serial number of converted wavelength of the (i, j)-th TWC.

The first wavelength router 410 can be an AWG having N×M input terminals and N×M output terminals for switching packets of output optical signals of the first wavelength converter 300. Accordingly, packets inputted by the input fibers can be dispatched averagely to available wavelengths and further the probability of output conflict is significantly reduced.

The second wavelength converter 420 consists of N×M tunable wavelength converters to convert wavelength for packets outputted by the first wavelength router 410. The control device 700 sets converted wavelengths of the tunable wavelength converters of the second wavelength converter 420 based on the following equation:

$$W_{ijkl}^2 = (NM - iM - j + k(L+1) + l) \bmod (NM), \quad (4)$$

where N is fiber number, M is transmittable wavelength number in one fiber, L is the maximum number of packet frames for time delay, i is serial number of input fiber for input packets, j is serial number of input wavelength for input packets, k is the number of packet frames required by input packets for time delay, l is serial number of output fiber for output packets, and $W_{ijkl}^2$ is serial number of converted wavelength of the (i, j)-th TWC.

The second wavelength router 430 can be an AWG having N×M input terminals and N×M output terminals for switching packets of output optical signals of the second wavelength converter 420.

In view of the foregoing, it is known that the present invention utilizes both the tunable wavelength converter and the wavelength router to accomplish multi-wavelength optical packet switching. The present invention also provides the output buffer connected to the output of the wavelength router for being shared by optical packets in all wavelengths (channels), thereby avoiding the packet loss due to output conflicts and reducing the cost of establishing the buffer.

Although the present invention has been explained in relation to its preferred embodiment, it is to be understood that many other possible modifications and variations can be made without departing from the spirit and scope of the invention as hereinafter claimed.

What is claimed is:

1. A multi-wavelength optical packet switch system with shared output buffer, comprising:
    N input fibers and N output fibers, each fiber being able to transmit an M-wavelength optical signal, which has M wavelengths, where N, M are positive integers;
    an input device consisting of N optical demultiplexers and connected to the N input fibers to separate the M-wavelength optical signal in each input fiber into M input optical signals corresponding to the M wavelengths;
    a wavelength converter, connected to the input device to tune wavelengths of the input optical signals, wherein the wavelength converter consists of N×M tunable wavelength converters, (I−1×M)-th to (I×M−1)-th tunable wavelength converters connected respectively to M output terminals of an I-th optical demultiplexer, where N, M, I are positive integers;
    a wavelength router, connected to the wavelength converter to switch packets of each optical signal outputted by the wavelength converter;
    an output buffer, connected to the wavelength router to provide output optical packets of the wavelength router with timer delay from 0 to L packet frames;
    a wavelength classifier, connected to the output buffer to tune wavelengths for the output optical packets to wavelengths of the corresponding output fibers; and
    a control device, connected to the wavelength converter to read packet headers of the input optical signals to accordingly analyze output fiber fields of all packet headers, thus obtaining corresponding output fibers and output conflicts for adjusting the wavelength converter and subsequently completing packet switching performed by the wavelength router;

wherein the control device is based on the following equation to set converted wavelengths of the tunable wavelength converters of the first wavelength converter:

$$W_{ijkl} = (NM - iM - j + k(L+1) + l) \bmod(NM),$$

where N is a fiber number, M is a transmittable wavelength number in one fiber, L is a maximum number of packet frames for time delay, i is a serial number of a respective input fiber for input packets, j is a serial number of a respective input wavelength for input packets, k is a number of packet frames required by the input packets for time delay, 1 is a serial number of a respective output fiber for output packets, and $W_{ijkl}$ is a serial number of a converted wavelength of the (i,j)-th tunable wavelength converter.

2. The system as claimed in claim 1, wherein each demultiplexer has an input terminal and M output terminals, the input terminal being connected to one of the input fibers for separating the M-wavelength optical signal in the input fiber into M input optical signals corresponding to the M wavelengths and thus the M output terminals outputting the M input optical signals respectively.

3. The system as claimed in claim 1, wherein the wavelength router is an arrayed wavegnide grating having N×M input terminals and (L×1)×N output terminals for switching packets of the optical signals fo the wavelength converter, where N, M, L are positive integers.

4. The system as claimed in claim 3, wherein the output buffer consists of N delay devices, each delay device having (L+1) optical delay elements numbered from 0 to L and a number p optical delay element providing time delay with p packet frames, where N, L, p are positive integers.

5. The system as claimed in claim 4, wherein input terminals of(L×1)×N optical delay elements of the output buffer are connected respectively to (L+1)×N output terminals of the wavelength router based on the following equation:

$$Ob_{ab} = a + bN,$$

where N is a total output fiber number, a is a serial number of a respective output fiber, b is a serial number of a respective optical delay element, and $Ob_{ab}$ is a serial number of an output port of the wavelength router.

6. The system as claimed in claim 5, wherein the (L+1)×N optical delay elements are optical fiber delay lines.

7. The system as claimed in claim 1, wherein the wavelength classifier consists of N wavelength classifying elements respectively coupled between the N delay devices of the output buffer and the N output fibers, each of the wavelength classifying elements further including:

an optical coupler having (L+1) input terminals and an output terminal, such that the (L+1) input terminals are connected respectively to the (L+1) optical delay elements for optically coupling signals of the (L+1) optical delay elements, and the output terminal outputs a resulting optically coupled optical signal;

a modulus optical demultiplexer having an input terminal and M output terminals, such that the input terminal is connected to the output terminal of the optical coupler for separating the resulting optical signal into M optical signals respectively with a different wavelength, and the M output terminals output the M optical signals respectively;

M fixed wavelength converters, each having an input terminal and output terminal, such that the input terminal is connected to one of the M output terminals of the demultiplexer for converting packets of output optical signals of the demultiplexer into an assigned wavelength for output by the output terminal; and an optical multiplexer having M input terminals and an output terminal, such that the M input terminals are connected respectively to the output of each of the converters for merging output optical signals with wavelengths and accordingly the output terminal outputs a resulting signal with the wavelengths to one of the N output fibers.

8. The system as claimed in claim 7, wherein the modulus optical demultiplexer is a 1×N arrayed waveguide grating.

9. A multi-wavelength optical packet switch system with shared output buffer, comprising:

N input fibers and N output fibers, each fiber being able to transmit an M-wavelength optical signal, which has M wavelengths, where N, M are positive integers;

an input device consisting ofN optical demultiplexers and connected to the N input fibers to separate the M-wavelength optical signal in each input fiber into M input optical signals corresponding to the M wavelengths;

a first wavelength converter, connected to the input device to tune wavelengths of the input optical signals, wherein the first wavelength converter consists of N×M tunable wavelength converters, (I−1×M)-th to (I×M−1)-th tunable wavelength converters connected respectively to M output terminals of an I-th optical demultiplexer, where N, M, I are positive integers;

a first wavelength router, connected to the first wavelength converter to switch packets of the input optical signals for averagely dispatching the packets to available wavelengths;

a second wavelength converter, connected to the first wavelength router to tune respective wavelengths of each optical signal outputted by the first wavelength router;

a second wavelength router, connected to the second wavelength converter to switch packets of each optical signal outputted by the second wavelength converter;

an output buffer, connected to the second wavelength router to provide output optical packets of the wavelength router with timer delay from 0 to L packet frames;

an output buffer, connected to the wavelength router to provide output optical packets of the wavelength router with time delay from 0 to L packet frames;

a wavelength classifier, connected to the output buffer to tune wavelengths for the output optical packets to wavelengths of the corresponding output fibers; and a control device, connected to the first and second wavelength converters to read packet headers of the input optical signals to accordingly analyze output fiber fields of all packet headers, thus obtaining output fibers and corresponding output conflicts for adjusting the first wavelength converter, setting the second wavelength converter, and subsequently completing packet switching of the optical signals by the wavelength router;

wherein the control device is based on the following equation to set converted wavelengths of the tunable wavelength converters:

$$W_{ij}^1 = i \times M + j,$$

where M is a transmittable wavelength number in one fiber, i is a serial number of a respective input fiber for input packets, j is a serial number of a respective output fiber for output packets, and $W_{ij}^1$ is a serial number of a converted wavelength of the (i,j)-th tunable wavelength converter.

10. The system as claimed in claim 9, wherein each demultiplexer has an input terminal and M output terminals, the input terminal being connected to one of the input fibers for separating the M-wavelength optical signal in the input fiber into M input optical signals corresponding to the M wavelengths and thus the M output terminals outputting the M input optical signals respectively.

11. The system as claimed in claim 9, wherein the first wavelength router is an arrayed waveguide grating having N×M input terminals and (L+1)×N output terminals for switching packets of the optical signals of the first wavelength converter, where N, M, L are positive integers.

12. The system as claimed in claim 11, wherein the second wavelength converter consists of N×M tunable wavelength converters to tune wavelengths of each optical signal outputted by the first wavelength router.

13. The system as claimed in claim 12, wherein the control device is based on the following equation to set converted wavelengths of the tunable wavelength converters of the second wavelength converter:

$$W_{ijkl}^2 = (NM - iM - j + k(L+1) + l) \bmod(NM),$$

where N is a fiber number, M is a transmittable wavelength number in one fiber, L is a maximum number of packet frames for time delay, i is a serial number of a respective input fiber for input packets, j is a serial number of a respective input wavelength for input packets, k is a number of packet frames required by the input packets for time delay, l is a serial number of a respective output fiber for output packets, and $W_{ijkl}^2$ is a serial number of a converted wavelength of the (i,j)-th tunable wavelength converter.

14. The system as claimed in claim 9, wherein the second wavelength router is an arrayed waveguide grating having N×M input terminals and (L+1)×N output terminals for switching packets of optical signals of the second wavelength converter, where N, M L are positive integers.

15. The system as claimed in claim 14, wherein the output buffer consists of N delay devices, each delay device having (L+1) optical delay elements numbered from 0 to L and a number p optical delay element providing time delay with p packet frames, where N, L, p are positive integers.

16. The system as claimed in claim 15, wherein input terminals of (L+1)×N optical delay elements of the output buffer are connected respectively to (L×1)×N output terminals of the second wavelength router based on the following equation:

$$Ob_{ab} = a + bN,$$

where N is a total output fiber number, a is a serial number of a respective output fiber, b is a serial number of a respective optical delay element, and $Ob_{ab}$ is a serial number of an output port of the second wavelength router.

17. The system as claimed in claim 16, wherein the (L+1)×N optical delay elements are optical fiber delay lines.

18. The system as claimed in claim 9, wherein the wavelength classifier consists of N wavelength classifying elements respectively coupled between the N delay devices of the output buffer and the N output fibers, each of the wavelength classifying elements further including:

an optical coupler having (L+1) input terminals and an output terminal, such that the (L+1) input terminals are connected respectively to the (L+1) optical delay elements for optically coupling signals of the (L+1) optical delay elements, and the output terminal outputs a resulting optically coupled optical signal;

a modulus optical demultiplexer having an input terminal and M output terminals, such that the input terminal is connected to the output terminal of the optical coupler for separating the resulting optical signal into M optical signals respectively with a different wavelength, and the M output terminals output the M optical signals respectively;

M fixed wavelength converters, each having an input terminal and an output terminal, such that the input terminal is connected to one of the M output terminals of the demultiplexer for converting packets of output optical signals of the demultiplexer into an assigned wavelength for output by the output terminal; and an optical multiplexer having M input terminals and an output terminal, such that the M input terminals are connected respectively to the output of each of the converters for merging output optical signals with wavelengths and accordingly the output terminal outputs a resulting signal with the wavelengths to one of the N output fibers.

19. The system as claimed in claim 18, wherein the modulus optical demultiplexer is a 1×N arrayed waveguide grating.

* * * * *